US005820288A

United States Patent [19]

Cole

[11] Patent Number: 5,820,288

[45] Date of Patent: Oct. 13, 1998

[54] ADJUSTABLE TOOL WITH A LOCKING HINGE MECHANISM

[75] Inventor: James E. Cole, Richardson, Tex.

[73] Assignee: Splined Tools Corporation, Dallas, Tex.

[21] Appl. No.: 842,353

[22] Filed: Apr. 24, 1997

[51] Int. Cl.[6] .......... F16B 9/02

[52] U.S. Cl. .......... 403/97; 403/298; 81/177.8

[58] Field of Search .......... 403/157, 154, 403/91, 97, 79, 298, 359, 103; 15/144.1; 81/177.8, 177.7

[56] References Cited

U.S. PATENT DOCUMENTS

| | | | |
|---|---|---|---|
| 151,315 | 5/1874 | Rowe . | |
| 928,375 | 7/1909 | Frick . | |
| 1,077,575 | 11/1913 | Wutke . | |
| 1,109,032 | 9/1914 | Bersted . | |
| 1,568,442 | 1/1926 | Carver . | |
| 1,840,685 | 1/1932 | Witherup . | |
| 2,420,132 | 5/1947 | Gryniuck . | |
| 2,603,325 | 7/1952 | Pickard . | |
| 2,671,367 | 3/1954 | Modin . | |
| 2,691,316 | 10/1954 | Brame . | |
| 2,921,773 | 1/1960 | Hoelzer . | |
| 3,002,409 | 10/1961 | Jones . | |
| 3,039,339 | 6/1962 | Hanson . | |
| 3,175,436 | 3/1965 | Coleman . | |
| 3,188,895 | 6/1965 | Jones . | |
| 3,270,597 | 9/1966 | Neff et al. . | |
| 3,314,318 | 4/1967 | Shoults . | |
| 4,027,558 | 6/1977 | Fish . | |
| 4,145,124 | 3/1979 | Weisgerber | 403/359 X |
| 4,184,783 | 1/1980 | Hall | 403/157 |
| 4,270,417 | 6/1981 | Tesero . | |
| 4,281,601 | 8/1981 | Overman | 403/97 X |
| 4,406,186 | 9/1983 | Gummow . | |
| 4,479,409 | 10/1984 | Antonius . | |
| 4,582,445 | 4/1986 | Warshawsky | 403/97 |
| 4,596,167 | 6/1986 | White, Jr. . | |
| 4,747,328 | 5/1988 | Howard . | |
| 4,774,862 | 10/1988 | Scull . | |
| 4,794,829 | 1/1989 | Mesenhoeller . | |
| 4,800,785 | 1/1989 | Christensen . | |
| 4,901,608 | 2/1990 | Shieh . | |
| 4,929,113 | 5/1990 | Sheu | 403/157 |
| 5,197,817 | 3/1993 | Wood et al. | 403/97 X |
| 5,386,747 | 2/1995 | Grover . | |
| 5,471,899 | 12/1995 | Twomlow . | |
| 5,522,287 | 6/1996 | Chiang . | |
| 5,581,838 | 12/1996 | Rocco | 403/91 X |

FOREIGN PATENT DOCUMENTS

| | | | |
|---|---|---|---|
| 14270 | 6/1913 | Canada . | |
| 3023882 | 1/1982 | Germany | B25G 1/06 |

OTHER PUBLICATIONS

Brochure of Truecraft Tools (Division of Daido Corporation, New Jersey) Six Piece ¾ Spline Drive Multi Angel Ratchet Set Item #7336 "The Ratchet with All the Angels", (No Date).

*Primary Examiner*—Harry C. Kim
*Attorney, Agent, or Firm*—Dickstein Shapiro Morin & Oshinsky LLP

[57] ABSTRACT

An adjustable tool with a locking hinge mechanism is disclosed which is movable between a plurality of selectable positions. A hinge pin splined along substantially its entire length holds the portions of the tool together, and is movable between an unlocked position and a locked position. In the unlocked position, the tool is adjustable, and in the locked position the tool is fixed in position and suitable for use.

18 Claims, 3 Drawing Sheets

ADJUSTABLE TOOL WITH A LOCKING HINGE MECHANISM

The present invention relates to adjustable tools that are movable between a plurality of selectable positions and particularly to adjustable tools that can be locked in any one of the selected positions. More particularly, the invention relates to adjustable tools having a locking hinge mechanism with a hinge pin holding the portions together, the hinge pin being movable between an unlocking position wherein the tool is movable between positions and a locking position wherein the tool is locked in a selected position and prevented from moving to another position.

BACKGROUND OF THE INVENTION

Adjustable tools that are movable between multiple operative positions are known. For example, U.S. Pat. No. 2,291,773 to Hoelzer relates to an adjustable pry bar having a splined pin connecting a handle and a pry point. Hoelzer's pry point includes a pair of arms and the handle includes a shoulder operatively disposed between the arms. When the shoulder is positioned between the arms, a splined bore extends through the arms and shoulder for receiving a splined pin. Hoelzer's splined pin is moveable in the splined bore between a locking position and an unlocking position. A resilient member biases the pin toward the locked position.

As illustrated in FIG. 1, Hoelzer's pin includes a pair of circumferential, non-splined portions having reduced diameters alternating with a pair of splined portions. One of the non-splined portions extends longitudinally along the pin a distance equal to the width of the arms and is offset from the second end of the pin by a distance equal to the width of the arms. One of the splined portions is disposed between the non-splined portions and extends longitudinally along the pin a distance equal to the width of the shoulder.

When the pry point is operatively connected to the handle and the pin is in the locking position, as illustrated in FIG. 1, one of the non-splined portions is disposed outside the splined bore adjacent a first arm, and the other is disposed within the shoulder portion of the splined bore. One of the splined portions is positioned completely within one of the arm portions of the splined bore. The other splined portion is positioned in the other arm portion of the bore and extends partially into the shoulder portion of the bore.

Thus, as illustrated in FIG. 1, the splines of the pin engage only a fraction of the splines in the shoulder portion of the splined bore. The lack of full engagement weakens the joint and limits the usefulness and effectiveness of the pry bar.

A completely different approach to providing an adjustable tool is disclosed in the Guman Patent DE 3023883 to Frundar which relates to a ratchet wrench having a pivoting ratchet head. As shown in FIGS. 2*a* and 2*b*, Frundar discloses a splined pin disposed to engage a splined external surface formed on the ratchet head, with the longitudinal axis of the splined pin oriented at a 90° angle to the hinge pin of the ratchet head. The splinded surface on the ratchet head is curved and the pin includes a rounded, circumferential groove configured to match the contour of the curved surface. The splines on the pin extend circumferentially around the pin within the groove. The pin further includes a flat portion which is configured to release engagement between the pin and the curved surface to allow the ratchet head to pivot relative to the handle. The flat portion is further configured to interact with a resilient member for retaining the pin in engagement with the curved surface. Unfortunately, like Hoelzer, Frundar provides for only limited engagement between the pin and the splines on the curved surface.

SUMMARY OF THE INVENTION

The locking hinge mechanism of the present invention provides full engagement between a splined pin and a splined bore that extends across the width of an adjustable tool. According to the present invention, an adjustable tool with a locking hinge mechanism comprises a first hinge portion having a pair of arms, a second hinge portion having a shoulder sized and configured to fit between the pair of arms, and a splined hinge pin. The pair of arms and the shoulder cooperate to define a splined bore extending through both arms and the shoulder for receiving the splined hinge pin. The splined hinge pin is movable between a locking position and an unlocking position and includes a retainer for retaining the hinge pin in either position. The hinge bore includes a release for engaging the retainer to permit movement of the hinge pin in the hinge bore.

According to one aspect of the invention, the retainer includes a resilient retaining ring coupled to the hinge pin and the release includes beveled ends of the splines in the shoulder portion of the hinge bore and in one of the arm portions of the hinge bore. The beveled spline ends provide conical openings into the splined bore. During initial movement of the pin from either the locking or the unlocking positions, the resilient retaining ring is urged against the conical opening, thereby compressing the ring and releasing the ring for movement to the other position. At either position, the retaining ring is allowed to expand beyond the inner diameter of the splines and thereby retain the pin in position. The retaining ring and conical opening provide an efficient and effective means for retaining the pin in either position and for releasing the pin for movement between positions.

Advantageously, the splines on the hinge pin of the present invention engage the splined bore substantially along the entire length of the bore, providing increased strength and stability. Additionally, the present invention eliminates the need for a resilient member urging the pin into the engaged position, thereby decreasing inventory and manufacturing costs. Thus, the invention provides an improved adjustable tool that is stronger yet cheaper and easier to manufacture.

DETAILED DESCRIPTION OF THE DRAWINGS

Figure 1:
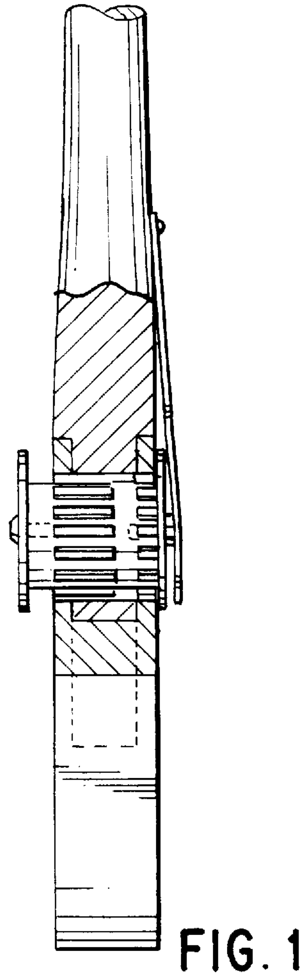
FIG. 1 PRIOR ART
FIG. 1 is a partial section view of a prior art adjustable tool.
Figure 2A:
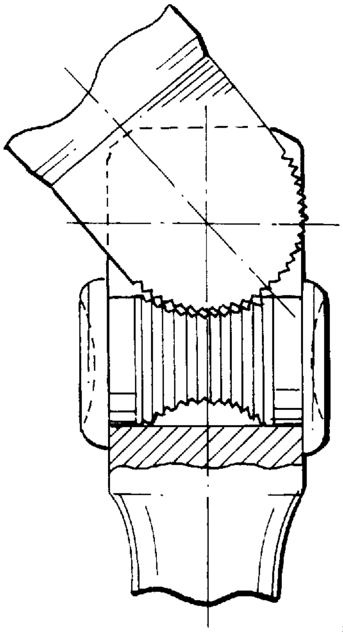
FIG. 2a PRIOR ART
FIGS. 2*a* and 2*b* are side and top views of a prior art adjustable ratchet wrench.
Figure 2B:
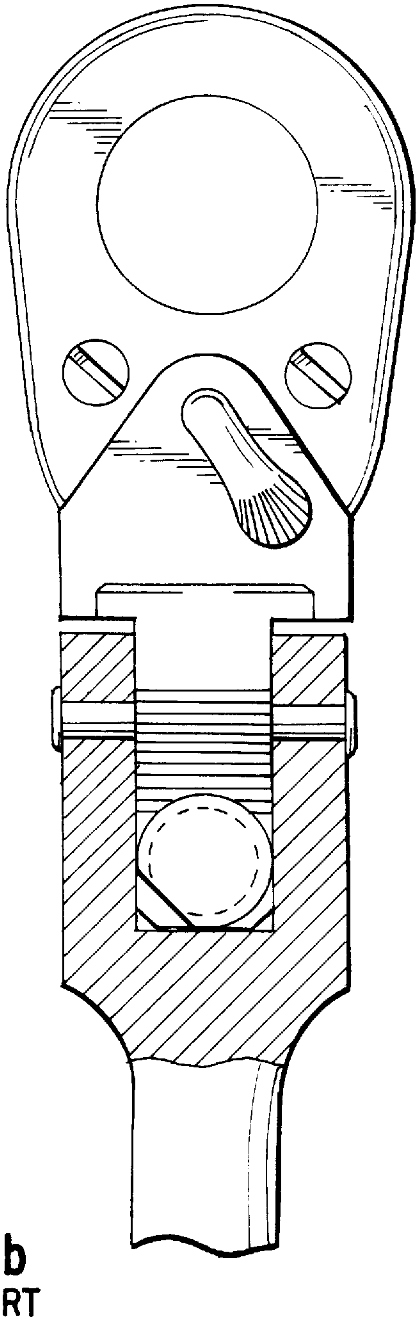
FIG. 2b PRIOR ART
Figure 3:
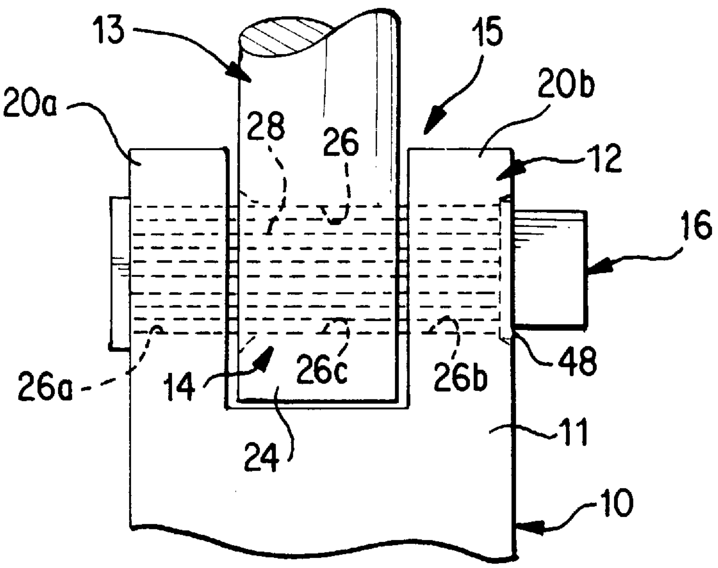
FIG. 3 is a plan view of a hinge mechanism of the present invention with the hinge pin in the locking position.
Figure 4:
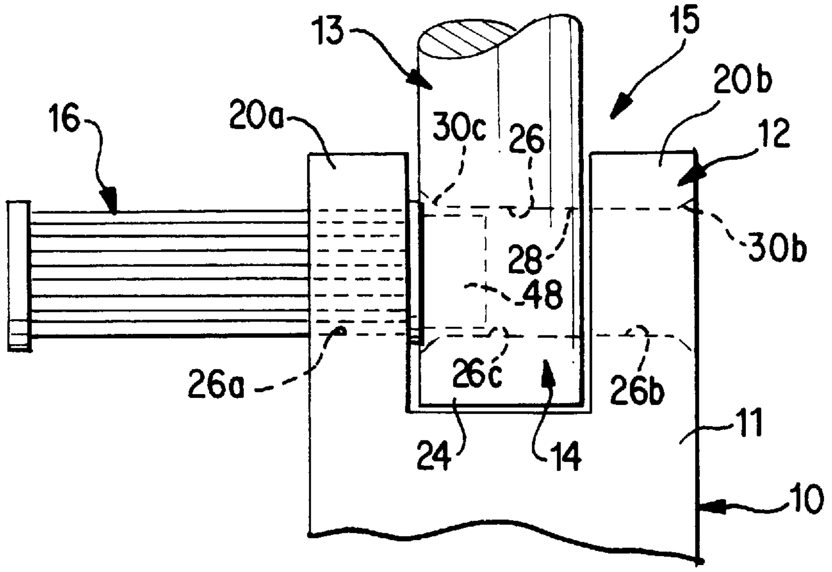
FIG. 4 a plan view of a hinge mechanism of FIG. 3 with the hinge pin in the unlocking position.
Figure 5:
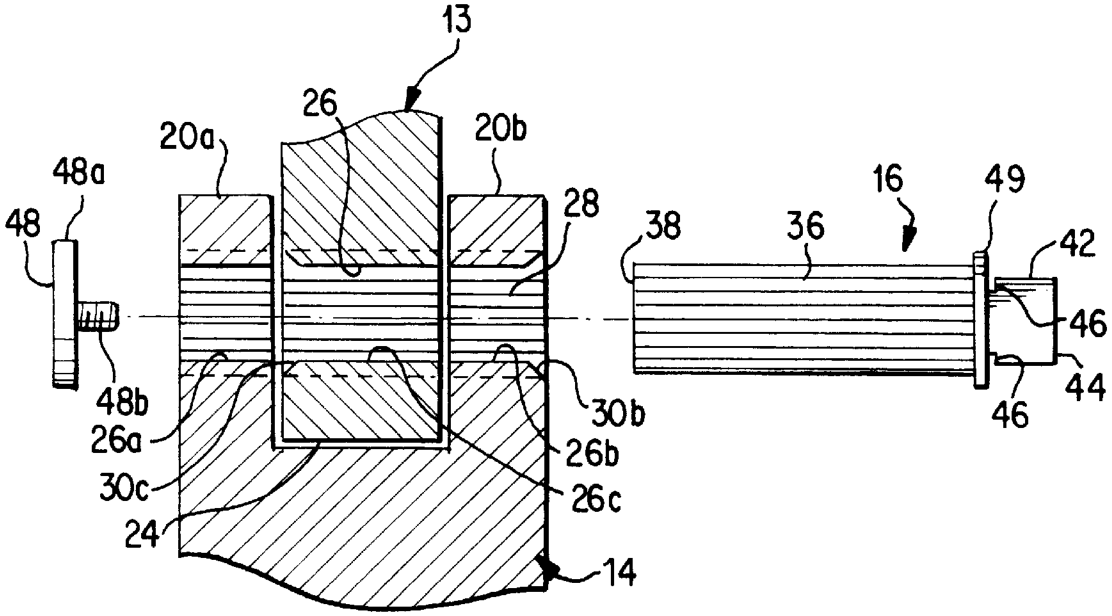
FIG. 5 is a side section view of the hinge mechanism with the hinge pin aligned with the hinge bore.

An adjustable tool 10 incorporating a locking hinge mechanism 15 according to the present invention is illustrated in FIGS. 3–5. The tool 10 includes a handle portion 11 and a working tip 13, such as a pry bar point or a ratchet head, pivotally coupled to each other by the locking hinge mechanism 15. The locking hinge mechanism 15 includes a first hinge portion 12, a second hinge portion 14, and a splined hinge pin 16. The first hinge portion 12 includes a pair of arms 20*a*, 20*b* arranged in spaced parallel relation. The second hinge portion 14 includes a shoulder 24 which is sized and configured to fit between the arms 20*a*, 20*b*. The arms 20*a*, 20*b* and the shoulder 24 cooperate to define a splined hinge bore 26 for receiving the splined hinge pin 16.

The splined bore 26 includes arm portions 26*a* 26*b* formed in arms 20*a*, 20*b*, respectively, and a shoulder portion 26*c* formed in the shoulder 24. Splines 28 extend longitudinally along substantially the entire length of the bore 26. The splines 28 in arm bore portion 26*b* and shoulder bore portion 26*c* include beveled ends that form conical openings 30*b*, 30*c* into the arm bore portion 26*b* and the shoulder bore portion 26*c*, respectively.

FIG. 5 shows a cylindrical hinge pin 16 aligned with the splined bore 26 and provided with a plurality of longitudinally extending splines 36 for engaging the splines 28 of the splined bore 26. The splines 36 extend from a first end 38 of the pin 16 for a distance substantially equal to the width of the hinge mechanism 15. An unsplined tip 42 is disposed at a second end 44 of the pin 16 and is separated from the splines 36 by a circumferential groove 46. In one embodiment of the pin 32, an end cap 48 is threadedly coupled to the first end 38 of the pin 16 and sized to prevent the first end 38 from entering the hinge bore 26. The end cap 48 can include a blocking plate 48*a* integrally formed with a threaded portion 48*b* as illustrated in FIG. 5, or it can include a screw and washer combination or the like.

Figure 6:
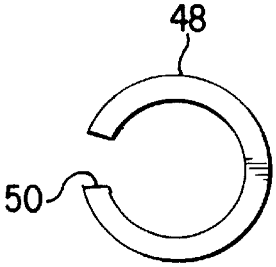
FIG. 6 is a retaining ring for use with the hinge pin of FIG. 5.

A retaining ring 49, illustrated in FIG. 6, is operatively disposed in the groove 46 and includes a gap 50 which is sized to allow the ring 49 to be compressed sufficiently to fit inside the bore 26. In the uncompressed configuration, the ring 49 is sized to interfere with the splines 28 formed in the hinge bore 26 and to engage the conical openings 30*b*, 30*c*.

In the locking position, the hinge pin 16 is fully inserted into the hinge bore 26, with the unsplined tip 42 extending out of the bore 26. The end cap 48 prevents the hinge pin 16 from being pushed into the hinge bore 26 from the left, as viewed in FIG. 3, while the retaining ring 49 interferes with the beveled ends of the splines 28 to prevent the pin 16 from entering the bore 26 from the right. The splines 28 and 36 engage each other substantially along the entire length of the splined bore 26, preventing the working tip 13 from pivoting relative to the handle 11.

To move the pin 16 to the unlocking position, a user pushes the pin 16 to the left as viewed in FIGS. 3–4, urging the retaining ring 49 against the conical opening 30*b*, and thereby compressing the ring 49. As the pin 16 moves into the bore 26, the ring 49 compresses to a diameter that allows passage of the ring 49 through the bore 26. The pin 16 continues to move through the bore 26 until the ring 49 encounters the conical opening 30*c* in the shoulder 24. As the ring 49 moves into the conical opening 30*c*, it expands and interferes with the splines in the arm bore portion 26*b*, thereby preventing the pin 16 from passing completely through the bore 26. The conical opening 30*c* cooperates with the splines in the arm bore portion 26*b* to retain the ring 49 in the unlocking position. In the unlocking position, only the unsplined tip 42 extends into the shoulder bore portion 26*c*, allowing the working tip 13 to pivot about the unsplined tip 42 while retaining the axial alignment of the bore portions 26*a* 26*b* and 26*c*.

When the working tip 13 has been rotated to a desired position relative to the handle 11, the user pushes the pin 16 to the right, as viewed in FIGS. 3–4, urging the retaining ring 49 against the conical opening 30*c*. The engagement of the conical opening 30*c* and the retaining ring compresses the retaining ring 49 to a diameter that allows passage of the ring 49 through the bore 26 until the end cap 48 abuts the side of the tool, preventing further movement. As the pin 16 approaches the locking position, the retaining ring 49 enters the conical opening 30*b*, expanding to interfere with the splines 28 and thereby retaining the pin 16 in the locking position.

Figure 7:
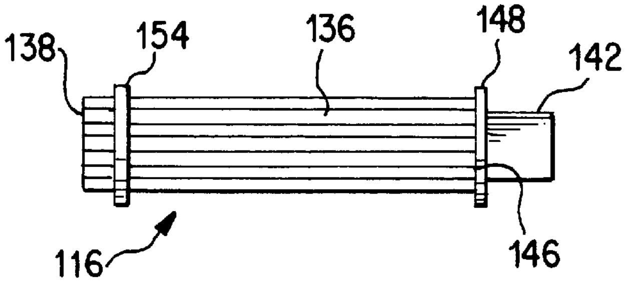
FIG. 7 is a side view of an alternative embodiment of the hinge pin.

FIG. 7 shows an alternative embodiment of the hinge pin 116. The pin 116 includes a plurality of longitudinally extending splines 136, a first end 138, an unsplined tip 142 and a retaining ring 148 disposed in a circumferential groove 146 as in pin 16. However, instead of an end cap, pin 116 includes a second circumferential groove with a second retaining ring 154 disposed therein to prevent the pin 116 from entering the bore 26 from the left, as viewed in FIGS. 3–4. The ring 154 is sized to interfere with the splines 28 or the side of the arm 20*a*. The arm bore portion 26*a* does not have a conical opening, so there is no means for compressing ring 154. As a result, the ring 154 becomes a stop ring and prevents the first end 138 of the pin 16 from moving into the splined hinge bore.

It will be appreciated by those of ordinary skill in the art that variations and modifications exist that do not depart from the scope of the invention.

I claim:

1. An adjustable tool with a locking hinge mechanism comprising:

a first hinge portion having a pair of arms;

a second hinge portion having a shoulder sized and configured to fit between the pair of arms, the pair of arms including a first splined bore extending through both arms and the shoulder including a second splined bore, the first and second splined bores being coaxially aligned and cooperating to form a splined hinge bore; and a hinge pin having a plurality of continuous splines for engaging the splines of the hinge bore substantially along the entire length of the hinge bore, the hinge pin being movable in the hinge bore between a hinge locking position wherein relative movement between the first and second hinge portions is prevented and a hinge unlocking position wherein relative movement between the first and second hinge portions is permitted.

2. The adjustable tool of claim 1 wherein the hinge pin includes means for retaining the hinge pin in one of the hinge locking position and the hinge unlocking position.

3. The adjustable tool of claim 2 wherein the hinge pin includes an end cap having a diameter greater than the diameter of the splined hinge bore, the end cap cooperating with the retaining means to retain the hinge pin in the splined hinge bore.

4. The adjustable tool of claim 2 wherein the retaining means includes a circumferentially extending groove and a resilient ring disposed in the groove and configured to interfere with the splines of the first and second splined bores.

5. The adjustable tool of claim 4 wherein the retaining means includes beveled edges formed on the splines of the second splined bore adjacent one of the arms, the resilient ring cooperating with the beveled edges to retain the hinge pin in the hinge unlocking position.

6. The adjustable tool of claim 4 wherein the retaining means includes beveled edges formed on the splines of the first splined bore, the resilient ring cooperating with the beveled edges to retain the hinge pin in the hinge locking position.

7. The adjustable tool of claim 3 further including a means for releasing the hinge pin from the hinge locking position for movement to the hinge unlocking position.

8. The adjustable tool of claim 1 wherein the hinge pin includes a resilient ring and the first hinge portion includes a first ring release disposed to engage the resilient ring to permit movement of the hinge pin from the hinge locking position to the hinge unlocking position.

9. The adjustable tool of claim 8, wherein the second hinge portion includes a second ring release disposed to engage the resilient ring when the hinge pin is in the hinge unlocking position and release the hinge pin for movement from the hinge unlocking position to the hinge locking position.

10. An adjustable tool with a locking hinge mechanism comprising:

a first hinge portion having a pair of arms;

a second hinge portion having a shoulder sized and configured to fit between the pair of arms, the pair of arms including a first splined bore extending through both arms and the shoulder including a second splined bore, the first and second splined bores being coaxially aligned and cooperating to form a splined hinge bore;

a hinge pin having a plurality of splines for engaging the splines of the hinge bore and being movable in the hinge bore between a hinge locking position wherein relative movement between the first and second hinge portions is prevented and a hinge unlocking position wherein relative movement between the first and second hinge portions is permitted; and a retainer coupled to the hinge pin, the retainer being configured to interfere with the splines of the splined hinge bore to retain the hinge pin in the unlocking position.

11. The tool of claim 10 wherein the retainer includes a resilient ring and the first hinge portion includes a release disposed to engage the retainer, the resilient ring being released in response to engagement with the release to permit movement of the hinge pin between the hinge locking position and the hinge unlocking position.

12. The tool of claim 11 wherein the release includes a conical opening portion of the first splined bore, the resilient ring being compressed in response to engagement with the conical opening portion to reduce the diameter of the resilient ring.

13. The tool of claim 10 wherein the retainer includes a resilient ring and the second hinge portion includes a release disposed to engage the resilient ring, the resilient ring being compressed in response to engagement with the release to permit movement of the hinge pin between the hinge locking position and the hinge unlocking position.

14. The tool of claim 13 wherein the release includes a conical opening portion of the second splined bore, the resilient ring being compressed in response to engagement with the conical opening portion to reduce the diameter of the resilient ring.

15. An adjustable tool with a locking hinge mechanism comprising:

a first hinge portion having a pair of arms;

a second hinge portion having a shoulder sized and configured to fit between the pair of arms, the pair of arms including a first splined bore extending through both arms and the shoulder including a second splined bore, the first and second splined bores being coaxial aligned and cooperating to form a splined hinge bore, wherein at least one of the first and second splined bores includes a hinge pin release; and a hinge pin having a plurality of splines for engaging the splines of the hinge bore and being movable in the hinge bore between the first and second hinge portions is prevented and a hinge unlocking position wherein relative movement between the first and second hinge portions is permitted.

16. An adjustable tool with a locking hinge mechanism comprising:

a first hinge portion having a pair of arms;

a second hinge portion having a shoulder sized and configured to fit between the pair of arms, the pair of arms including a first splined bore extending through both arms and the shoulder including a second splined bore, the first and second splined bores being coaxially aligned and cooperating to form a splined hinge bore, wherein at least one of the first and second hinge portions includes a hinge pin release;

a hinge pin having a plurality of splines for engaging the splines of the hinge bore and being movable in the hinge bore between a hinge locking position wherein relative movement between the first and second hinge portions is prevented and a hinge unlocking position wherein relative movement between the first and second hinge portions is permitted; and a resilient retaining ring coupled to the pin, the retaining ring being sized to interfere with the splines of the splined hinge bore, the release including a conical opening portion in the splined hinge bore, the retaining ring being compressed in response to engagement with the release to reduce the diameter of the retaining ring.

17. An adjustable tool with a locking hinge mechanism comprising:

a first hinge portion having a pair of arms;

a second hinge portion having a shoulder sized and configured to fit between the pair of arms, the pair of arms including a first splined bore extending through both arms and the shoulder including a second splined bore, the first and second splined bores being coaxially aligned and cooperating to form a splined hinge bore, wherein each of the first and second hinge portions includes a hinge pin release;

a hinge pin having a plurality of splines for engaging the splines of the splined hinge bore and a resilient retaining ring coupled to the pin for engaging the splines of the splined hinge bore, the hinge pin being movable in the splined hinge bore in response to engagement between the resilient retaining ring and the hinge pin release, the hinge pin being moveable between a hinge locking position wherein relative movement between the first and second hinge portions is prevented and a hinge unlocking position wherein relative movement between the first and second hinge portions is permitted.

18. An adjustable tool with a locking hinge mechanism comprising:

a first hinge portion having a pair of arms;

a second hinge portion having a shoulder sized and configured to fit between the pair of arms, the pair of arms including a first splined bore extending through both arms and the shoulder including a second splined bore, the first and second splined bores being coaxially aligned and cooperating to form a splined hinge bore having a first end and a second end; and a hinge pin having a plurality of splines for engaging the splines of the hinge bore substantially along the entire length of the hinge bore, the hinge pin being movable in the hinge bore between a hinge locking position wherein relative movement between the first and second hinge portions is prevented and a hinge unlocking position wherein relative movement between the first and second hinge portions is permitted; and a retainer coupled to the hinge pin, the retainer being disposed between the first and second ends to retain the hinge pin in the hinge unlocking position.

* * * * *